(12) United States Patent
Dickow

(10) Patent No.: US 10,962,447 B2
(45) Date of Patent: Mar. 30, 2021

(54) GAS FEED UNIT FOR AN EXHAUST-GAS ANALYSIS UNIT FOR THE MEASUREMENT OF EXHAUST GASES OF INTERNAL COMBUSTION ENGINES

(71) Applicant: AVL EMISSION TEST SYSTEMS GMBH, Neuss (DE)

(72) Inventor: Achim Dickow, Velbert (DE)

(73) Assignee: AVL EMISSION TEST SYSTEMS GMBH, Neuss (DE)

( * ) Notice: Subject to any disclaimer, the term of this patent is extended or adjusted under 35 U.S.C. 154(b) by 113 days.

(21) Appl. No.: 16/341,922

(22) PCT Filed: Sep. 27, 2017

(86) PCT No.: PCT/EP2017/074500
§ 371 (c)(1),
(2) Date: Apr. 15, 2019

(87) PCT Pub. No.: WO2018/072977
PCT Pub. Date: Apr. 26, 2018

(65) Prior Publication Data
US 2019/0242786 A1    Aug. 8, 2019

(30) Foreign Application Priority Data
Oct. 17, 2016   (DE) ...................... 10 2016 119 713.0

(51) Int. Cl.
*G01M 15/10*    (2006.01)
*F01N 11/00*    (2006.01)
*G01N 1/22*    (2006.01)

(52) U.S. Cl.
CPC .......... *G01M 15/102* (2013.01); *F01N 11/005* (2013.01); *G01M 15/10* (2013.01); *G01N 1/2252* (2013.01)

(58) Field of Classification Search
CPC ..... F01N 11/00; G01M 15/10; G01M 15/102; G01N 1/2252
(Continued)

(56) References Cited

U.S. PATENT DOCUMENTS

2003/0226588 A1    12/2003    Olander et al.
2006/0005607 A1    1/2006    Blumke et al.
(Continued)

FOREIGN PATENT DOCUMENTS

CN    200986532 Y    12/2007
CN    203798572 U    8/2014
(Continued)

*Primary Examiner* — Eric S. McCall
(74) *Attorney, Agent, or Firm* — Norman B. Thot

(57) ABSTRACT

A gas feed unit for an exhaust gas analysis unit includes a measurement unit for analysing a sample gas, a connection line arranged so that a calibration gas line, a purge gas line, and a sample gas line opens thereinto and which fluidically connects to the measurement unit, a shut-off valve arranged in each of the calibration gas line, the purge gas line, and the sample gas line, a pump which delivers the sample gas from an exhaust gas source, an outflow line with an outflow nozzle and a shut-off valve, and an outflow nozzle arranged at an end of the connection line opposite to the measurement unit. The outflow line branches off from the connection line. The sample gas line is arranged to open into the connection line between the measurement unit, the calibration gas line, and the purge gas line.

12 Claims, 1 Drawing Sheet

(58) Field of Classification Search
USPC .......................................... 73/114.69, 114.71
See application file for complete search history.

(56) References Cited

U.S. PATENT DOCUMENTS

| | | | |
|---|---|---|---|
| 2008/0148716 A1* | 6/2008 | Nishibu | F01N 3/2066 60/295 |
| 2011/0016854 A1* | 1/2011 | Gaudin | F01N 3/0253 60/299 |
| 2011/0203558 A1 | 8/2011 | Pappenheimer | |
| 2013/0312489 A1* | 11/2013 | Watanabe | G01N 1/2252 73/23.31 |
| 2014/0130589 A1 | 5/2014 | Doering | |
| 2014/0290336 A1 | 10/2014 | Miyai | |
| 2015/0020582 A1 | 1/2015 | Dickow et al. | |
| 2018/0017470 A1* | 1/2018 | Willich | G01N 1/2247 |
| 2018/0171898 A1* | 6/2018 | Ulrey | F01N 13/107 |
| 2019/0234349 A1* | 8/2019 | Ulrey | F02M 26/02 |
| 2020/0141844 A1* | 5/2020 | Shade | G01N 1/38 |

FOREIGN PATENT DOCUMENTS

| | | |
|---|---|---|
| CN | 204188565 U | 3/2015 |
| CN | 205157418 U | 4/2016 |
| DE | 43 17 867 A1 | 12/1994 |
| DE | 198 28 818 A1 | 12/1999 |
| JP | S52-135191 U | 10/1977 |
| JP | S62-237341 A | 10/1987 |
| JP | H08-226878 A | 9/1996 |
| JP | 2005-156306 A | 6/2005 |

* cited by examiner

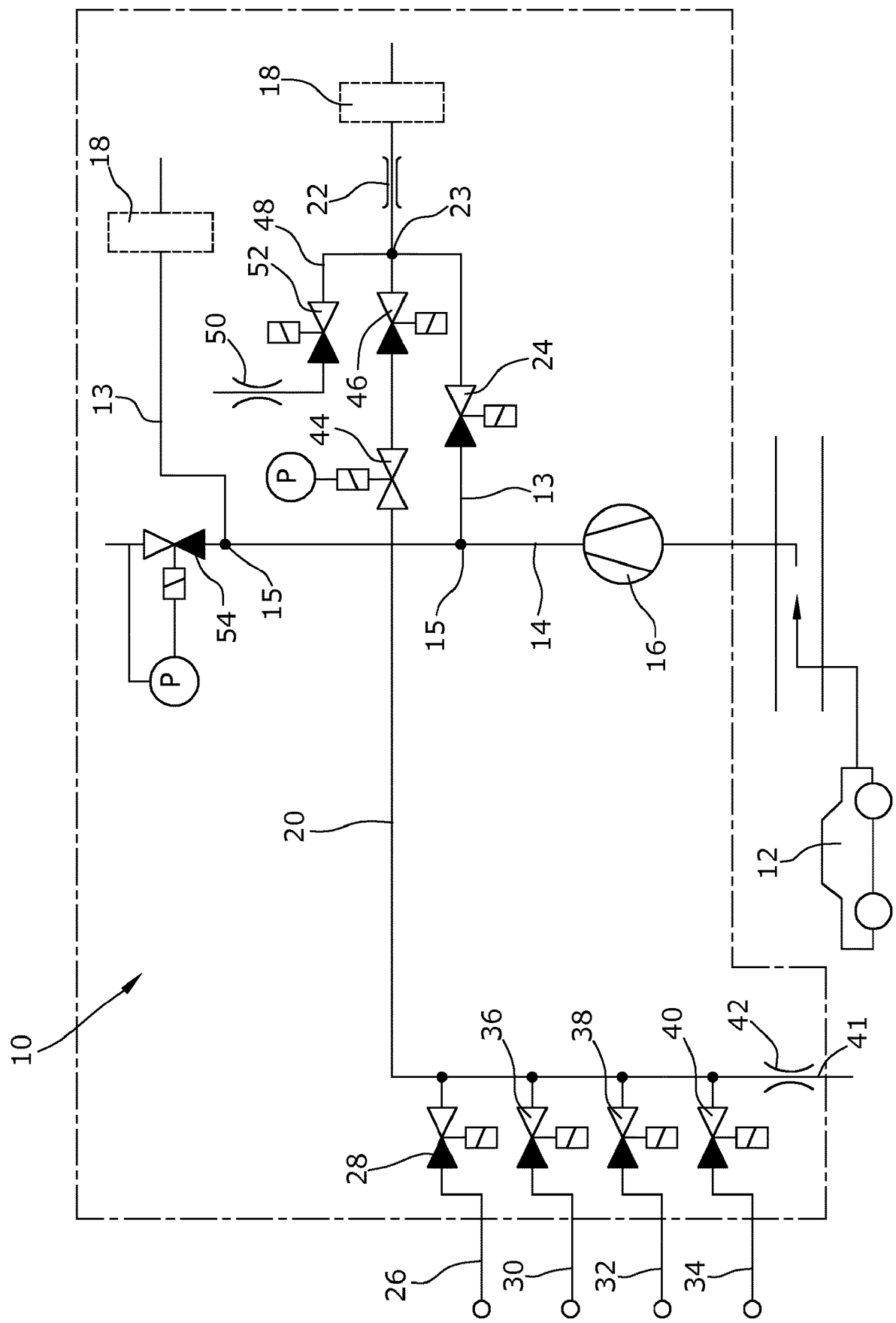

GAS FEED UNIT FOR AN EXHAUST-GAS ANALYSIS UNIT FOR THE MEASUREMENT OF EXHAUST GASES OF INTERNAL COMBUSTION ENGINES

CROSS REFERENCE TO PRIOR APPLICATIONS

This application is a U.S. National Phase application under 35 U.S.C. § 371 of International Application No. PCT/EP2017/074500, filed on Sep. 27, 2017 and which claims benefit to German Patent Application No. 10 2016 119 713.0, filed on Oct. 17, 2016. The International Application was published in German on Apr. 26, 2018 as WO 2018/072977 A1 under PCT Article 21(2).

FIELD

The present invention relates to a gas feed unit for an exhaust gas analysis unit for the measurement of exhaust gases of internal combustion engines, having a measurement unit for the analysis of sample gas, a calibration gas line, a purge gas line and a sample gas line which open into a common connection line via which a fluidic connection to the measurement unit can be produced, shut-off valves in the calibration gas line, the purge gas line and the sample gas line via which the sample gas flow, the calibration gas flow and the purge gas flow can be selectively shut off or released, and a pump for delivering the sample gas flow out of an exhaust gas source.

BACKGROUND

Exhaust gas analysis units are used, for example, at roller test benches of motor vehicles. The analysis cabinets used for this purpose contain the drive and electronic systems in the exhaust gas measuring system, which may be configured as a CVS system (constant volume sample), but may also serve, for example, for analyzing undiluted exhaust gas. The analysis cabinets used for this purpose also contain the measurement units required to analyze the exhaust gas to determine the amount of harmful substances therein. These measurement units include, for example, a flame ionization detector analyzing unit to determine hydrocarbons, a gas chromatograph to determine the amount of methane, a chemiluminescence detector analyzing unit to determine the amount of nitrogen oxide in the exhaust gas, and infrared detector analyzing units to determine various active components, such as carbon monoxide, carbon dioxide or hydrocarbon compounds in the exhaust gas. The control cabinet is accordingly connected to the sampling probes of the exhaust gas take-off system via lines which are connected to the control cabinet via corresponding couplings.

The measurement units are supplied via gas feed units via which either sample gas to be analyzed, calibration gas, or purge gas is fed.

The through-flow rates in these gas feed units normally amount to approximately 10 to 12 l/min. In modern internal combustion engines, however, the amount of exhaust gases is continuously being reduced as a result of improved and cleaner combustion. Not only is the composition of the actually emitted exhaust gas measured, but also the composition of the exhaust gas which is, for example, recirculated via an exhaust gas recirculation line. This recirculated exhaust gas in particular always influences the subsequent combustion processes so that the extraction can be carried out merely in very small through-flow rates since the effect on the engine would otherwise be so large that the combustion data would no longer correspond to those of a normal operation. If information regarding the composition of this exhaust gas is required to be submitted with very small delays of 1 second, for example, an extremely strong dilution would have to be used to obtain adequate through-flow rates for the analysis unit. However, this results in very inaccurate measuring values since the limits of the measuring accuracy of existing measurement units are reached when such strong dilutions are used. Falsifications of the measuring results are consequently considerably increased due to contamination by the gas previously supplied by the gas feed unit.

SUMMARY

An aspect of the present invention is to provide a gas feed unit for the measurement of exhaust gases of internal combustion engines which have small through-flow rates but which nevertheless provide the measuring gas to the measurement units as rapidly as possible so that accurate measuring values are obtained while minimizing an effect on the internal combustion engine.

In an embodiment, the present invention provides a gas feed unit for an exhaust gas analysis unit for a measurement of exhaust gases of an internal combustion engine. The gas feed unit includes a measurement unit for the analysis of a sample gas, at least one calibration gas line, a purge gas line, a sample gas line, a common connection line arranged to have each of the at least one calibration gas line, the purge gas line, and the sample gas line open thereinto and to provide a fluidic connection to the measurement unit, a shut-off valve arranged in each of the at least one calibration gas line, the purge gas line, and the sample gas line, a pump configured to deliver a flow of the sample gas from an exhaust gas source, an outflow line comprising an outflow nozzle and a shut-off valve arranged therein, and an outflow nozzle arranged at an end of the common connection line opposite to the measurement unit. Each of the shut-off valves is configured so that a flow of the sample gas, a flow of a calibration gas, and a flow of a purge gas is shut off or released. The outflow line is configured to branch off from the common connection line. The sample gas line is arranged to open into the common connection line between the measurement unit, the at least one calibration gas line, and the purge gas line.

BRIEF DESCRIPTION OF THE DRAWING

The present invention is described in greater detail below on the basis of embodiments and of the drawing in which:

The FIGURE shows a schematic flow diagram of a gas feed unit for an exhaust gas analysis unit according to the present invention.

DETAILED DESCRIPTION

Due to the fact that the sample gas line opens into the connection line between the respective measurement unit and the calibration gas line as well as the purge gas line, wherein at the end of the connection line opposite the measurement unit an outflow nozzle is arranged and an outflow line branches off the connection line and contains an outflow nozzle and a shut-off valve, at the beginning of the measurements, only very small volumes filled with purge gas, calibration gas or sample gas of previous measurements must be evacuated to allow for the sample gas flow to be measured to reach the measurement unit. Falsifications of the measurements are also considerably reduced since no sample gas must flow past the connection lines of the purge gas or the calibration gas. This leads to very rapidly obtained and correct measuring results and allows for a reduction of the through-flow rate due to small dead volumes. The outflow nozzle arranged at the end of the connection line opposite the measurement unit also prevents the sample gas flow from being pressed into the connection line towards the purge gas and calibration gas connections and from flowing from there back towards the measurement unit, which would affect the measuring results. The sample gas, which reaches the section filled with the purge or calibration gases, instead flows to the outside via the nozzle and thus removes the calibration and purge gases from these line sections. Via the outflow nozzle and the shut-off valve in the outflow line, gas previously present in the line is rapidly removed from the connection line, which gas, during the switching between the various gas flows, can flow out via the nozzle when the valve is open so that merely the respective residual gas in the measurement unit must be removed from the overall system. Purging can also be carried out with a larger gas flow than the gas flow for which the measurement unit is designed.

The outflow line can, for example, branch off the connection line between the opening of the sample gas line and the measurement unit. Purge or calibration gas present in the connection line is accordingly displaced from the line by the sample gas without having to flow through the measurement unit. If a larger amount of the sample gas is delivered than can flow to the measurement unit through a flow restrictor, residual gas is removed from both the line and the measurement unit itself within a very short time so that reliable measuring results are very rapidly obtained.

It is additionally advantageous when the shut-off valve in the outflow line is open when one of the shut-off valves of the calibration gas line is open, and is closed when the shut-off valve of the sample gas line is open. The measurement unit is thus very rapidly ready for use after the purging process.

In an embodiment of the present invention, the purge gas line can, for example, open into the connection line between each calibration gas line and the opening of the sample gas line. As a result, no gas residues from the calibration gas line can be entrained during introduction of the purge gas. The calibration gas is instead completely removed from the connection line by the purge gas flow.

It is further advantageous that the gas feed unit comprises a plurality of calibration gas lines into which calibration gases of different concentrations of the gas component to be measured are adapted to be introduced, wherein the calibration gas lines open into the connection line at an ever increasing distance to the measurement unit with an increasing concentration of the gas component to be measured. No contamination by more highly concentrated calibrating gas can thus occur after a one-time removal of the previously used calibration gas from the connection line since the low-dose calibration gas is not fed past the line of the more highly dosed calibration gas. The more highly dosed calibration gas can instead be completely discharged at the opposite end of the connection line via the outflow nozzle.

A pressure control valve can, for example, be arranged in the connection line downstream of the calibration gas line and the purge gas line. Both the pressure of the various calibration gases and of the purge gas in the connection line can accordingly be controlled via this valve.

In an embodiment of the present invention, a shut-off valve can, for example, be arranged in the connection line. Undesired flows through the connection line can accordingly be stopped. The shut-off valve is, for example, closed during the analysis of the sample gas and is open during the calibration and purging. The sample gas is thus rapidly removed from the line so that purging and calibration can be carried out after a short time. Due to the small sample gas flows in the exhaust gas analysis unit, an additional outflow of the sample gas in front of the measurement unit is prevented and thus an adequate supply of the measurement unit with a sample gas for analysis purposes is provided.

In an embodiment of the present invention, the shut-off valve can, for example, be arranged in the connection line downstream of the pressure control valve and upstream of the opening of the sample gas line. During the measurements of the sample gas, the connection line can thus be closed towards other lines so that the sample gas does not flow through additional volumes. Accurate measuring results are accordingly obtained within a very short time even in the case of small amounts of exhaust gas.

According to another advantageous aspect of the present invention, the exhaust gas analysis unit can, for example, comprise a plurality of measurement units which are respectively fluidically connected to a sample gas main line via a sample gas line and a connection line, wherein a pressure in the sample gas lines is adapted to be controlled via a back pressure controller at the end of the sample gas main line. The sample gas pressure can thus be controlled for a plurality of measurement units via merely one pressure controller during the measurements in the analysis unit. Components can thereby be saved.

The pump for delivering the sample gas flow can, for example, also be arranged upstream of the measurement units. This prevents a contamination of the sample gas flow via small leaks in the analysis unit since no gas is taken in, but is instead pressed through the system. An overpressure is thereby produced in the system which reliably prevents an inflow from outside and which allows the gas flows to escape via the nozzles.

The pump advantageously delivers a sample gas flow of 2.5 to 3.0 l/min. so that a relatively compact membrane pump can be used. The withdrawal of such a small amount of gas allows exhaust gas from the exhaust gas recirculation duct to be analyzed, for example, without any effects on the operating state of the engine to be tested being expected.

The inner diameter of the connection line and the sample gas line is approximately 2 to 4 mm to realize such a small through-flow rate while providing an adequate velocity in the lines.

A gas feed unit for an exhaust gas analysis unit for the measurement of exhaust gases of internal combustion engines is thus provided via which accurate measuring values can be obtained at a very short response time even in the case of very small through-flow rates by preventing falsifications of the measuring values by contamination from outside or by purge or calibrating gases. An effect of the sampling on the internal combustion engine is additionally excluded.

An exemplary embodiment of the gas feed unit for an exhaust gas analysis unit for the measurement of exhaust gases of internal combustion engines according to the present invention is illustrated in the FIGURE and is described below.

Exhaust gas analysis units 10 are supplied with an exhaust gas from an exhaust gas source 12, such as an internal combustion engine of a motor vehicle. Depending on the system used, this exhaust gas is supplied to the analysis unit 10 either in a diluted or in an undiluted form. The sample gas is delivered either directly from a take-off line or from sample gas bags into a sample gas main line 14 therefor via a pump 16 which, in the present exemplary embodiment, presses the sample gas into the sample gas main line 14 so that a contamination of the sample gas due to leaks in the sample gas main line 14 and the adjoining sample gas lines 13 can be excluded.

The sample gas main line 14 comprises different branches 15 from which the sample gas flow can be delivered to various measurement units 18 via the sample gas lines 13, which measurement units 18 are usually arranged in a switch cabinet. These measurement units 18 are a flame ionization detector analyzing unit for the determination of hydrocarbons, a chemiluminescence detector analyzing unit for the determination of the amounts of nitrogen oxide in the exhaust gas, or an infrared detector analyzing unit for the determination of various active components, such as carbon monoxide, carbon dioxide or hydrocarbon compounds in the exhaust gas, for example, and are respectively supplied via their own connection line 20 either with the sample gas or with a purge gas or one or a plurality of calibration gases. For respectively feeding a proper amount of measurement gas to a measurement unit 18, a throttle valve or capillary tube 22 is provided in front of the measurement unit 18 via which the gas flow is restricted.

In the section of the sample gas line 13 located behind the branch 15, a shut-off valve 24 is arranged via which the sample gas line 13 is adapted to be shut off in front of its opening 23 into the connection line 20.

A purge gas line 26 opens into the connection line 20 upstream of the opening 23 of the sample gas line 13 via which purge gas, for example, nitrogen, can be delivered towards the measurement unit 18. A shut-off valve 28 for opening and closing the purge gas line 26 is also located in purge gas line 26. In the present exemplary embodiment, three calibration gas lines 30, 32, 34 open into the connection line 20 upstream of the purge gas line 26, wherein the distance of the opening of the respective calibration gas line 30, 32, 34 into the connection line 20 to the measurement unit 18 increases with an increasing concentration of the calibration gas. The concentration is respectively raised to the power of 10, for example, at an increased distance to the measurement unit 18. A respective shut-off valve 36, 38, 40 is arranged in each of the calibration gas lines 30, 32, 34 via which the respective calibration gas flow can be released or stopped.

An outflow nozzle 42 is arranged at the end 41 of the connection line 20 opposite the measurement unit 18 via which the respective gas in the connection line 20 is pressed out of the connection line 20 during delivery of another gas so that it does not flow back towards the measurement unit 18. It is thus provided that, after the delivery of calibration gas from the calibration gas line 32, for example, during the delivery of calibration gas from the calibration gas 30 line, no calibration gas from the calibration gas line 32 or from the upstream section of the connection line 20 is pressed towards the measurement unit 18. This would result in considerably longer calibration times since a complete removal of the residual gases from the lines 20, 26, 30, 32, 34 would take a substantially longer time.

For pressure control of the calibration gases and the purge gas, a pressure control valve 44 and a shut-off valve 46 are arranged in the connection line 20 in front of the opening 23 of the sample gas line 13 into the connection line 20, which shut-off valve 46 is closed during the analysis of the sample gas so that the sample gas cannot flow towards the calibration gas lines, 30, 32, 34 and the latter are thus not contaminated with the sample gas.

Such a contamination is also prevented by an outflow line 48 branching off the connection line 20 downstream of the shut-off valve 46, in which outflow line 48 an outflow nozzle 50 and a time-controlled shut-off valve 52 are arranged via which the gas previously present in the connection line 20, in particular the sample gas, can be pressed out of the connection line 20 during delivery of the purge gas or the calibration gases. The time-controlled shut-off valve 52 is open during the purging process or the calibration process so that larger amounts of the respective gas can be delivered to the connection line 20, which gas can then expel the amounts of residual gas therein within a very short time, which residual gas can be discharged via the outflow nozzle 50. Once a change-over to the exhaust gas analysis operation has been carried out, switching of the shut-off valve 46 in the connection line allows for using a small amount of sample gas for expelling the gases from the remaining connection line section 20 and the measurement unit 18. After termination of the calibration or purging, the shut-off valve 52 in the outflow line 48 switches and closes the cross-section of the outflow line 48 so that a small amount of sample gas suffices for supplying the measurement unit 18 with an adequate amount of sample gas.

The pressure of the sample gas is controlled via a back pressure controller 54 which is arranged in the sample gas main line 14 at the end of the sample gas main line 14 downstream of the branches 15 leading to the measuring units 18.

The sample gas lines only have a diameter of approximately 2 to 4 mm, and a volume flow of only approximately 2.5 to 3 l/min flows therethrough. This is realized with the particular arrangement of the outflow nozzles 42, 50 and the shut-off valves 24, 46, 52 via which an evacuation of the previously-delivered gases from the volumes can occur in a very short period of time despite the small volume flows. These small volume flows allow for an exhaust gas measurement even in areas where very small amounts of exhaust gas exist, such as in the area of the exhaust gas recirculation, without any effects on the combustion process of the engine being expected. The measuring results are highly accurate despite the small amounts due to the complete and reliable evacuation by avoiding dead spaces through which gas can flow.

It should be understood that the scope of protection of the present invention is not limited to the described exemplary embodiment. The present invention can be used for various types of exhaust gas measurement systems. Pressure control can also be carried out in other ways, or more or fewer calibration gases can be used. Reference should also be had to the appended claims.

What is claimed is:

1. A gas feed unit for an exhaust gas analysis unit for a measurement of exhaust gases of an internal combustion engine, the gas feed unit comprising:
   a measurement unit for the analysis of a sample gas;
   at least one calibration gas line;
   a purge gas line;
   a sample gas line;
   a common connection line arranged to have each of the at least one calibration gas line, the purge gas line, and the sample gas line open thereinto and to provide a fluidic connection to the measurement unit;
   a shut-off valve arranged in each of the at least one calibration gas line, the purge gas line, and the sample gas line, each of the shut-off valves being configured so that a flow of the sample gas, a flow of a calibration gas, and a flow of a purge gas is shut off or released;

a pump configured to deliver a flow of the sample gas from an exhaust gas source;

an outflow line comprising an outflow nozzle and a shut-off valve arranged therein, the outflow line being arranged to branch off from the common connection line; and an outflow nozzle arranged at an end of the common connection line opposite to the measurement unit, wherein, the sample gas line is arranged to open into the common connection line between the measurement unit, the at least one calibration gas line, and the purge gas line.

2. The gas feed unit as recited in claim 1, wherein, the gas feed unit comprises a plurality of calibration gas lines which are configured so that different concentrations of the calibration gas of a gas component to be measured can be introduced therein, and the plurality of calibration gas lines are each arranged to open into the common connection line at a distance to the measurement unit which increases with an increasing concentration of the gas component to be measured.

3. The gas feed unit as recited in claim 1, further comprising:

a sample gas main line;

a back pressure controller arranged at an end of the sample gas main line; and a plurality of measurement units which are respectively fluidically connected to the sample gas main line via the sample gas line and the common connection line, wherein, a pressure in the sample gas line is configured to be controlled via the back pressure controller at the end of the sample gas main line.

4. The gas feed unit as recited in claim 1, wherein an internal diameter of the sample gas line and of the common connection line is each approximately 2 to 4 mm.

5. The gas feed unit as recited in claim 1, wherein the pump which is configured to deliver the flow of the sample gas is arranged upstream of the measurement unit.

6. The gas feed unit as recited in claim 5, wherein the pump is configured to deliver the sample gas with a flow rate of 2.5 to 3.0 l/min.

7. The gas feed unit as recited in claim 1, wherein, the sample gas line comprises an opening into the common connection line, and the outflow line is arranged to branch off from the common connection line between the opening and the measurement unit.

8. The gas feed unit as recited in claim 7, wherein, the shut-off valve arranged in the outflow line is open when one shut-off valve of the at least one calibration gas line is open, and the shut-off valve arranged in the outflow line is closed when the shut-off valve of the sample gas line is open.

9. The gas feed unit as recited in claim 7, wherein the purge gas line is arranged to open into the common connection line between the at least one calibration gas line and the opening of the sample gas line.

10. The gas feed unit as recited in claim 7, further comprising:

a pressure control valve arranged in the common connection line downstream of the at least one calibration gas line and the purge gas line.

11. The gas feed unit as recited in claim 10, further comprising:

a shut-off valve arranged in the common connection line.

12. The gas feed unit as recited in claim 11, wherein the shut-off valve arranged in the common connection line is arranged downstream of the pressure control valve and upstream of the opening of the sample gas line.

* * * * *